H. C. MUHLBACH.
WHEEL.
APPLICATION FILED DEC. 30, 1920.
1,374,217.
Patented Apr. 12, 1921.
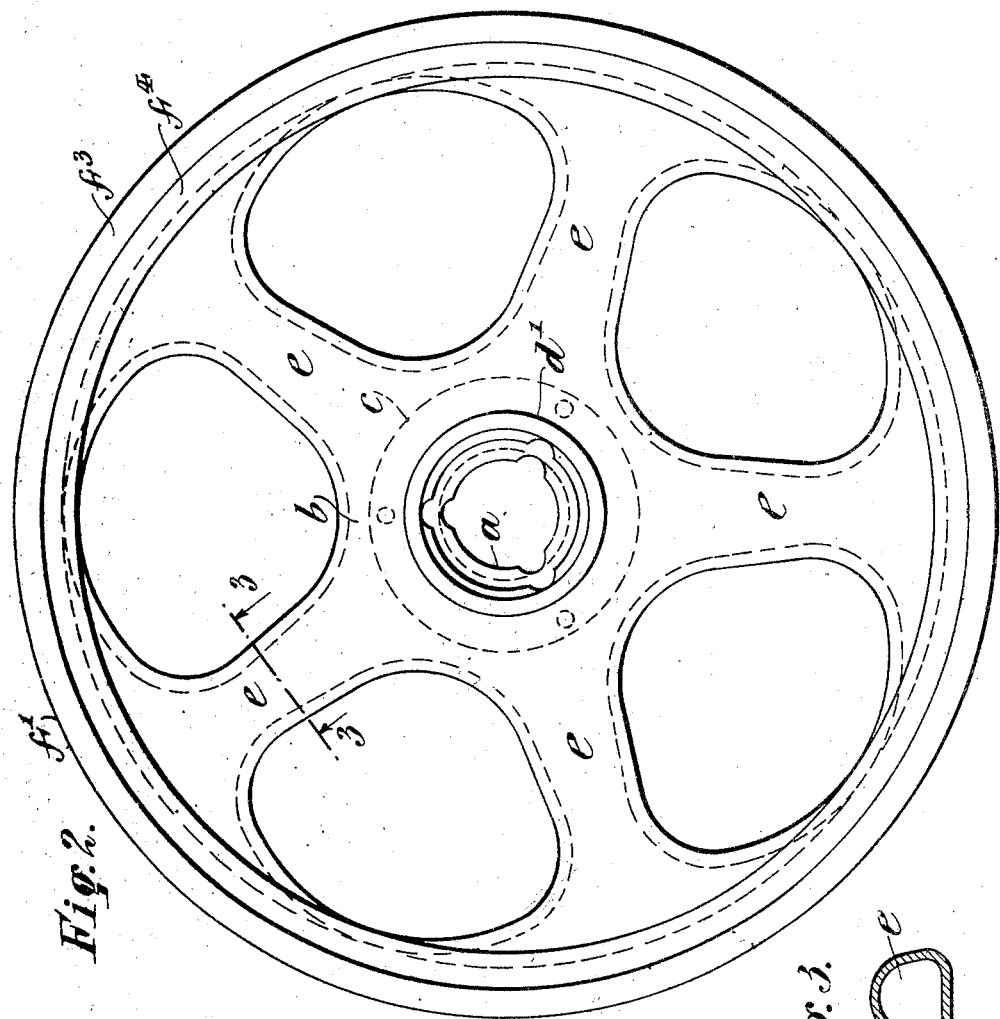
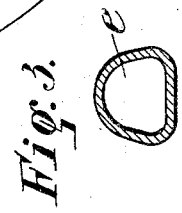
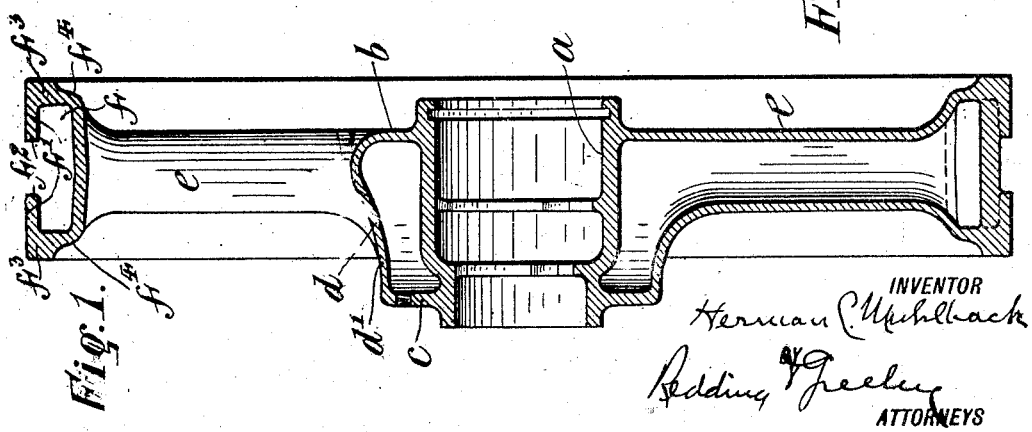
INVENTOR
Herman C. Muhlbach
Redding & Greeley
ATTORNEYS

UNITED STATES PATENT OFFICE.

HERMAN C. MUHLBACH, OF NEW YORK, N. Y., ASSIGNOR TO INTERNATIONAL MOTOR COMPANY, OF NEW YORK, N. Y., A CORPORATION OF DELAWARE.

WHEEL.

1,374,217.

Specification of Letters Patent. Patented Apr. 12, 1921.

Application filed December 30, 1920. Serial No. 434,172.

*To all whom it may concern:*

Be it known that I, HERMAN C. MUHLBACH, a citizen of the United States, residing in the borough of Queens of the city of New York, in the State of New York, have invented certain new and useful Improvements in Wheels, of which the following is a specification, reference being had to the accompanying drawing, forming a part hereof.

This invention is concerned generally with metal wheels for motor trucks, etc., and more particularly with integral, cast metal wheels having hollow spokes and channeled, tire-supporting rims. It has for its object to strengthen such wheels at the hub and at the joinder of the spokes to the hub without great increase of the weight of metal, as compared with wheels heretofore produced, and to strengthen such wheels at the rim. The improved hub has as usual an inner tubular wall to receive the bearings and an outer spoke-supporting wall, integrally connected with the inner wall and merged into the walls of the spokes, such outer wall being extended beyond the spokes toward the outer end of the hub, where it is united with the inner wall by a circumferential flange which forms a convenient surface for attachment of the hub cap or some other part. The channeled rim is so formed as to avoid the danger of a thin side wall, due to a possible shift of the core in the mold toward one side or the other and found heretofore to be a cause of occasional breakage through contact, for example, with a curb. The invention will be more fully explained hereinafter with reference to the accompanying drawing in which it is illustrated and in which—

Figure 1 is a view of the improved wheel in diametrical section.

Fig. 2 is a view of the same in side elevation.

Fig. 3 is a detail view in section on the plane indicated by the broken line 3—3 of Fig. 2.

In the embodiment of the invention shown in the drawing the inner wall $a$ of the hub is generally cylindrical and is suitably formed to receive the bearings and the usual spindle. Integral with the inner wall of the hub and united therewith by a circumferential flange $b$, near the inner or larger end of the hub, and by a circumferential flange $c$, near the smaller or outer end of the hub, is a spoke-supporting wall $d$ which merges with the walls of the spokes $e$. This spoke-supporting wall is extended, as at $d'$, beyond the spokes toward the outer end of the hub, where it is joined with the hub by the circumferential flange $c$, the portion of this wall beyond the spokes being generally cylindrical but flaring toward the spokes to merge with the walls of the spokes. This construction not only affords increased strength without material increase of weight, as compared with previous constructions, but it furnishes, without additional weight, a convenient surface, as at $c$, for the securing of the hub cap or some other part. This construction also avoids the necessity of radial flanges or webs which are sometimes provided for the strengthening of the hub and add materially to the weight of metal required.

The channeled tire-supporting rim $f$ has a substantially flat tread portion $f'$ with cylindrical flanges $f^2$, directed toward the central plane of the spokes, and parallel side flanges $f^3$, the outer circumferential portions of which are of substantially greater thickness than the walls of the hub and spokes, while the inner circumferential portions, as at $f^4$, are reduced in thickness and merge with the walls of the spokes. It has been found heretofore that in the manufacture of wheels of this character the core sometimes shifts in the mold toward one side or the other so that metal in the side walls of the rim is unequally distributed and the wall at one side may be so thin that it is liable to be fractured when the side of the rim strikes the curb, for example. By making the side walls of greater thickness, as described, the possible shifting of the core is not likely to reduce the thickness of either side wall to such a degree that there is danger of breakage, and at the same time a projecting portion of the rim guards the necessarily thinner walls of the rim, as at $f^4$, against contact with the curb.

I claim as my invention:

A cast metal wheel comprising a hub, hollow spokes and a tire-supporting rim, the hub having an inner tubular wall to receive bearings and an outer spoke-supporting wall extended beyond the spokes toward the outer end of the hub to form a substantially cylindrical wall and merged into the walls of the spokes, and circumferential flanges near the ends of the hub to which said outer wall is joined.

This specification signed this 27th day of December, A. D. 1920.

HERMAN C. MUHLBACH.